Jan. 11, 1966   R. E. ZAHN ETAL   3,228,175
AIR INTAKE STACK AND FILTER CARTRIDGE FOR FALLOUT SHELTERS
Filed March 5, 1962

INVENTORS
ROBERT E. ZAHN
WILLIAM H. WELTY

BY *Wright Wright*

ATTORNEYS and Filter Cartridge for Fallout Shelters
Robert E. Zahn, Milwaukee, and William H. Welty, Brookfield, Wis., assignors to Air Filter Corporation, Milwaukee, Wis., a corporation
Filed Mar. 5, 1962, Ser. No. 177,327
2 Claims. (Cl. 55—486)

This invention appertains to fallout shelters and more particularly to a novel filter air intake for such shelters.

In our prior patent No. 3,124,053 issued March 10, 1964 and entitled "Fallout Shelter," we illustrated an air intake stack and an air outlet stack for shelters with novel means for preventing a backdraft through the outlet stack.

One of the primary objects of this invention is to provide a novel filter assembly for the air intake stack and novel means including the stack protecting hood for detachably, but firmly, holding the assembly in position, and in sealing contact with the upper edge of the stack.

Another salient object of the invention is to provide a removable filter cartridge of an elongated hollow form for extending a material distance into and longitudinally of the stack, the cartridge being provided with a series of longitudinally extending flutes for reinforcing the structure, and for effectively increasing the active area thereof, whereby to provide a maximum amount of filtering area in a minimum amount of space.

A further important object of the invention is the provision of an elongated tubular filter cartridge embodying inner and outer walls or sheets of reticulated metal confining therebetween a mat of filtering material with novel means for forming and closing the lower end of the cartridge with the filtering material, so as to insure the filtering of all of the air entering the stack and into the cartridge.

A still further important object of the invention is to provide novel means for forming the upper edge of the cartridge so as to provide an outwardly projecting annular flange for fitting on the upper edge of the stack, with means carried by the stack protecting hood for engaging the flange to hold the same in sealing contact with the upper end of the stack and thereby insure the entrance of all of the air into the cartridge.

Figure 1:
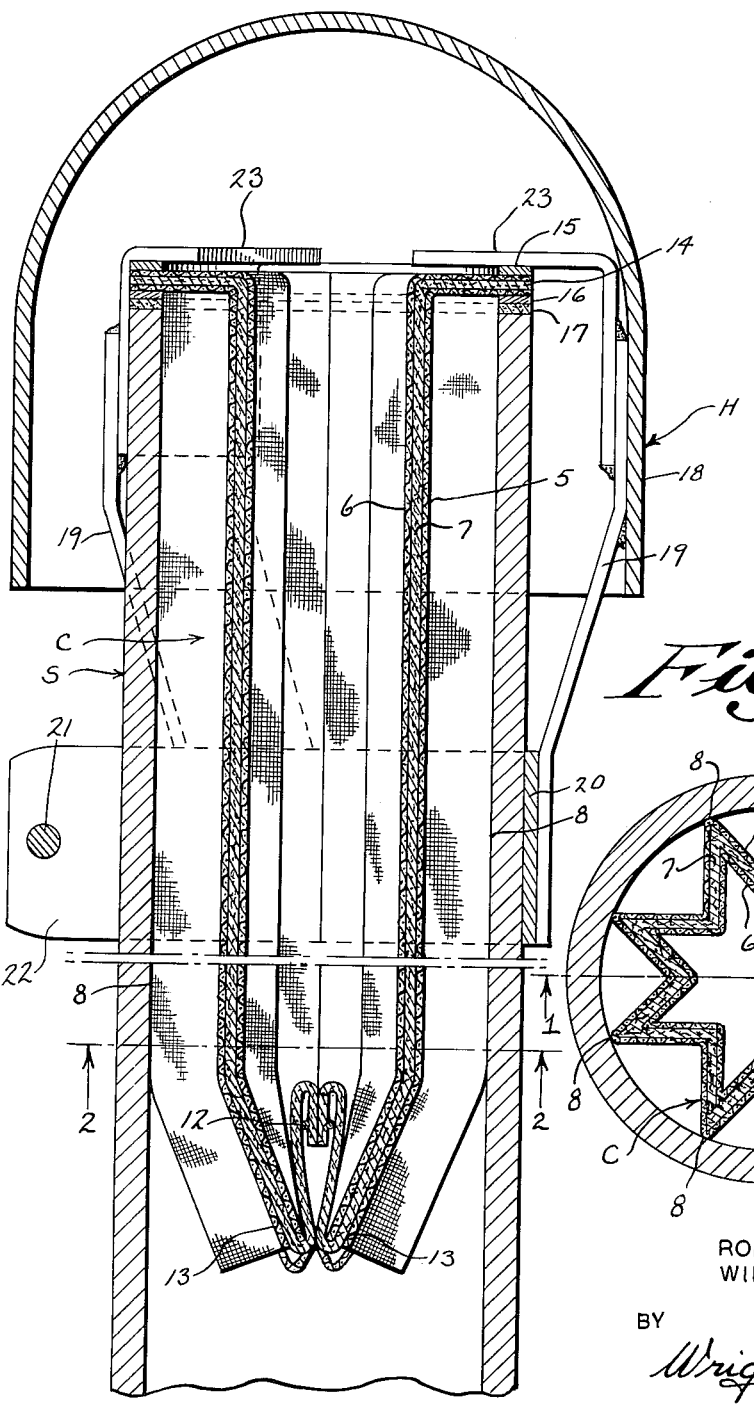
Figure 2:
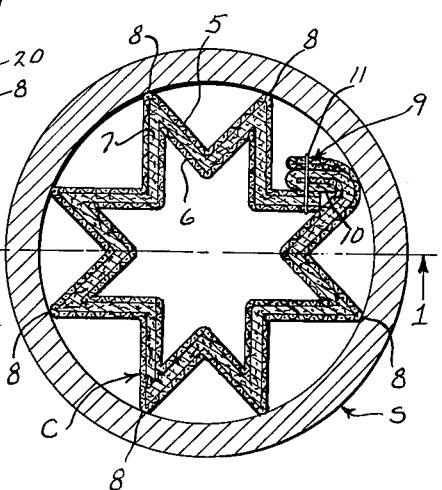

With these and other objects in view, the invention consists in the novel construction, arrangement and formation of parts, as will be hereinafter more specifically described and claimed, and illustrated in the accompanying drawing, in which drawing, FIGURE 1 is a vertical longitudinal sectional view through an air inlet stack showing the novel filter cartridge inserted within the stack and held in place by the protecting hood, the section being taken on the line 1—1 of FIGURE 2, and FIGURE 2 is a horizontal sectional view through the stack and cartridge taken on the line 2—2 of FIGURE 1, looking in the direction of the arrows.

Referring to the drawing in detail, wherein similar reference characters designate corresponding parts throughout the several views, the letter S indicates an air inlet stack leading to a building, such as a fallout shelter. The stack S protrudes into the atmosphere a desired and selected height and is preferably constructed from heavy pipe of a desired and selected diameter. Received within the stack is the novel filter cartridge C. The upper inlet end of the stack S is protected by a sturdy removable protecting hood H.

The filter cartridge C is of an elongated tubular form and includes inner and outer walls 5 and 6 of recticulated metal. This metal can be sheets of finely woven wire mesh. The inner and outer walls 5 and 6 form filtering sheets and more particularly define means for confining a mat 7 of filtering material. The filtering material forming the mat can be of any variety, such as cotton batten, fiber glass or any other selected and preferred material. To increase the active area of the tubular cartridge the same is folded and creased to provide outwardly extending longitudinally disposed flutes 8, and hence the cartridge is of a substantially star-shaped form in cross-section.

It is extremely desirable that all of the air entering the stack will flow through the cartridge and thus be properly filtered. Hence, care is taken to insure a proper fit of the cartridge with the inlet end of the stack and with the formation of the lower end of the cartridge and formation of the cartridge iteself, whereby air leakage is prevented.

In actual practice, the cartridge is formed in a flat condition and is then creased and rolled into the tubular form and this provides a longitudinally extending seam 9. To form a leakproof seam the filter mat 7 is extended from the longitudinal edges of the inner and outer walls 5 and 6 and this extended portion of the mat is folded back upon wall 6, as indicated by the reference character 10. Metal stitches 11 can then be provided for securing the overlapping longitudinal edges of the seam together.

During the folding and bending of the cartridge into its tubular form the lower end of the filter mat 7 is extended a considerable distance beyond the walls 5 and 6 and this extended end of the mat is brought into a folded cone-shaped terminal, and this cone-shaped terminal is held in such form by a tie cord or the like 12. The tied cone-shaped terminal is then folded into the body of the lower end of the cartridge. After this, the lower end of the body of the cartridge is bent inwardly, as at 13, to close the lower end of the cartridge. This holds the tied material in place within the inner body of the filter unit so the air pressure cannot open the material and escape. In fact, the air pressure will tend to force and hold the tied mat material against the closed end and thus further aid as an air seal. A second function of this construction is to permit the air flow to expand and thus reduce air resistance to a minimum.

The upper end of the cartridge is bent outwardly to provide an annular flange 14. The outer diameter of the cartridge including the peaks or flutes 8 is substantially equal to the inner diameter of the stack S. The annular flange 14, however, is of a greater size than the diameter of the body of the cartridge so that this flange can seat on the upper edge of the stack S. To reinforce the flange 14, upper and lower metal washers 15 and 16 are placed in abutting relation to the flange and these metal washers are spot welded together and to the metal screen cloth. To insure a proper seal and good seat between the flange and upper edge of the stack the lower washer 16 can have secured thereto by an adhesive a felt washer 17. If desired a similar felt washer can be adhesively secured to the top washer 15 and where such felt washer is employed the same forms a cushion seat for the feet 23 and this will compensate for any slight axial misalignment of the feet.

The protecting hood H includes a dome-shaped body 18 of heavy metal and the inner face of the dome-shaped body has welded thereto depending supporting legs 19. The legs 19 are bowed inwardly and are in turn, welded to a split supporting collar 20. This collar 20 encircles the stack and is held in gripping contact with the stack by an adjusting bolt 21 which extends through ears 22 formed on the terminals of the split collar. The dome also has welded thereto right angularly extending holding feet 23 and these feet project inwardly toward the axial center of the dome and rest on the annular flange 14.

Care is taken in placing the hood in position so that the feet will firmly rest on the flange and thus hold the flange in sealing contact with the upper edge of the stack. Thus leakage of air between the flange and into the stack between the stack and cartridge is prevented.

The cartridge can be easily placed into and removed from the stack by merely taking off the hood H. Thus, the cartridge can be washed and cleaned or replaced by a new one.

Great stress is laid on the formation of the cartridge whereby sealing contact is insured with the stack and so that the cartridge will be supported by the stack. The provision of the inner and outer and center filter media is important as is the general construction of the cartridge itself.

Various changes in details may be made without departing from the spirit or the scope of this invention, but what is claimed as new is:

1. An air intake stack for fallout shelters and the like comprising a length of pipe having an open upper end, an elongated depending tubular filter cartridge having an open upper end and a closed lower end removably fitted within the upper end of the pipe and having an outwardly extending annular flange resting on the upper end of the pipe whereby the cartridge is detachably supported within the pipe, a sealing washer engaging said flange in intimate contact with the upper end of the pipe, said cartridge including inner and outer sheets of screen cloth and a central filtering mat confined therebetween, said cartridge having radially extending longitudinally disposed flutes, the sheets with the filter mat being overlapped to form a longitudinal seam, said filter mat at the seam being extended beyond the outer sheets and folded back on itself for intimate engagement with an edge of the seam to form an airtight structure, said filter mat at the lower end of said body being extended beyond the sheets, a tie securing the extended end of the mat together and said extended tie end being inserted within the body, a protecting hood for the pipe surrounding the upper end of the pipe having means for detachably connecting with the pipe, and inwardly extending feet carried by the inner surface of the hood and engaging the flange for holding the flange in tight contact with the upper end of the pipe.

2. A filter cartridge for air inlet stacks and the like comprising an elongated tubular body having an open upper end and a closed lower end, said body including inner and outer sheets of wire mesh and an intermediate filter mat confined therebetween, the sheets with the filter mat being overlapped to form a longitudinal seam, said filter mat at the seam being extended beyond the outer sheets and folded back on itself for intimate engagement with an edge of the seam to form an air tight structure, and said filter mat at the lower end of the body being extended beyond the sheets, a tie securing the extended end of the mat together and said extended tie end being inserted within the body, and an annular supporting flange formed on the upper end of the body.

References Cited by the Examiner

UNITED STATES PATENTS

| | | | |
|---|---|---|---|
| 948,082 | 2/1910 | Wickwire | 55—379 XR |
| 1,064,412 | 6/1913 | White | 55—373 X |
| 1,676,024 | 7/1928 | Hansen | 210—493 |
| 1,682,897 | 9/1928 | Fesler | 210—493 |
| 1,958,735 | 5/1934 | Pall | 55—509 X |
| 2,016,993 | 10/1935 | Dollinger | 55—500 |
| 2,240,851 | 5/1941 | Lowther | 55—505 XR |
| 2,322,110 | 6/1943 | Bock | 55—521 X |
| 3,007,579 | 11/1961 | Pall | 210—493 X |
| 3,124,053 | 3/1964 | Zahn et al. | 98—1 |

ROBERT F. BURNETT, *Primary Examiner.*

HARRY B. THORNTON, *Examiner.*